(12) United States Patent
Jansson

(10) Patent No.: US 10,409,378 B2
(45) Date of Patent: Sep. 10, 2019

(54) VIBRATION DEVICE OF AN ELECTRONIC DEVICE

(71) Applicant: AAC Technologies Pte. Ltd., Singapore (SG)

(72) Inventor: Daniel Jansson, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 15/955,804

(22) Filed: Apr. 18, 2018

(65) Prior Publication Data

US 2019/0220093 A1  Jul. 18, 2019

(30) Foreign Application Priority Data

Jan. 12, 2018  (CN) .......................... 2018 1 0032544

(51) Int. Cl.
*G06F 3/16* (2006.01)
*G06F 3/01* (2006.01)
*G06F 1/16* (2006.01)

(52) U.S. Cl.
CPC ............ *G06F 3/016* (2013.01); *G06F 1/1684* (2013.01)

(58) Field of Classification Search
CPC ....... G06F 3/016; G06F 1/1684; H01L 41/09; H01L 41/0933; H01L 41/193; H04R 17/00

USPC ......... 340/407.1, 7.6, 539.11, 693.5; 310/15, 310/25; 368/10, 13; 381/191; 345/156, 345/173
See application file for complete search history.

(56) References Cited

U.S. PATENT DOCUMENTS

| | | | |
|---|---|---|---|
| 6,404,085 B2* | 6/2002 | Hamaguchi | B06B 1/045 310/81 |
| 9,294,846 B2* | 3/2016 | Iwasaki | H04R 17/00 |
| 2011/0133577 A1* | 6/2011 | Lee | H02K 33/18 310/15 |
| 2013/0259274 A1* | 10/2013 | Hayashi | H04M 1/03 381/190 |
| 2013/0261811 A1* | 10/2013 | Yagi | G06F 3/016 700/280 |
| 2014/0321677 A1* | 10/2014 | Fukuoka | H01L 41/09 381/191 |
| 2015/0318462 A1* | 11/2015 | Kim | G06F 3/016 310/332 |

* cited by examiner

*Primary Examiner* — Hung T Nguyen
(74) *Attorney, Agent, or Firm* — IPro, PLLC; Na Xu

(57) ABSTRACT

The present invention relates to a vibration device for providing tactile feedbacks. The vibration device includes a case having an accommodation space; and a vibration unit accommodated in the accommodation space and fastened with the case, for transmitting vibration produced by the vibration unit to the case and further driving the case to vibrate. The vibration unit includes a housing attached to the case by latching or soldering, and a tactile actuator fixed in the housing.

10 Claims, 3 Drawing Sheets

VIBRATION DEVICE OF AN ELECTRONIC DEVICE

FIELD OF THE PRESENT DISCLOSURE

The present disclosure related to electronic devices, and more particularly, to a vibration device used in an electronic device for providing tactile feedbacks.

DESCRIPTION OF RELATED ART

In rapid development process of electronic devices, people's demand on products' functions is higher. In order that the users can get more direct feedback from the electronic devices during interaction, the tactile feedback vibrator is developed. In the existing technology, the electronic device includes a frame and a vibration system installed on the frame. The vibration system transfers the vibration to the frame and drives the frame for vibration. The vibration system includes the shell and tactile feedback vibrator fixed in the shell. The shell is fixed on the frame directly through glue.

At least following problems exists in the existing technologies: On the one hand, a shell and a frame are fixed by glue in assembling process, so assembling process is tedious; on the other hand, as the shell and frame are fixed by glue, the glue is easy to be aged in service so the reliability is not high.

Thereof, it is necessary to disclose and provide an improved vibration device to overcome the above-mentioned disadvantages.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1:
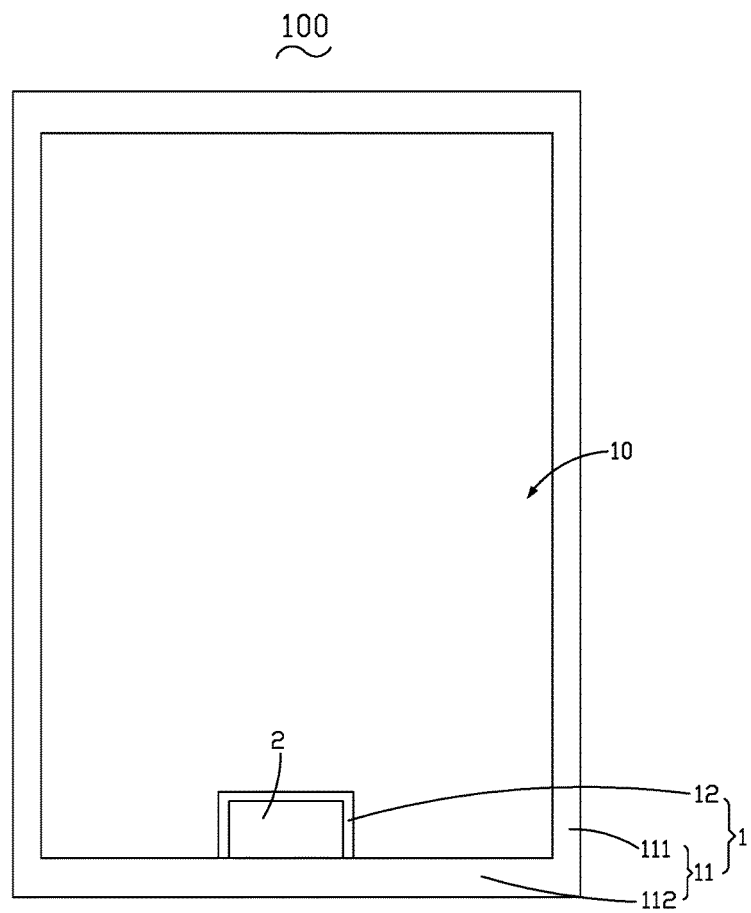
FIG. 1 is a top view of a vibration device in accordance with a first embodiment of the present invention.
Figure 2:
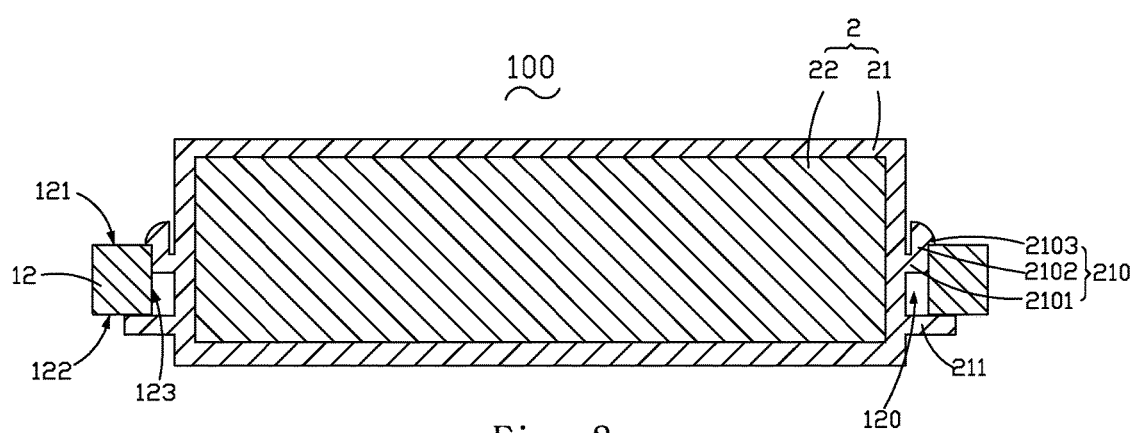
FIG. 2 is a cross-sectional view of a vibration unit and a supporting part of the vibration device in FIG. 1.

A vibration device 100, in accordance with a first embodiment of the present invention, is hereby disclosed. Referring to FIGS. 1-2, the vibration device 100 includes a case 1 having an accommodation space 10, and a vibration unit 2 accommodated in the accommodation space 10 and fixed with the case 1. The vibration unit 2 transmits vibration produced thereby to the case and further drives the case 1 to vibrate. The vibration unit 2 includes a housing 21 and a tactile actuator 22 fastened on the housing 21. The housing 21 is assembled with the case 1 by latching.

The housing 21 is latched with the case 1 for fastening the vibration unit 2 with the case by mechanical means, which simplifies the assembly steps by avoid using glue, and further improves the stability of the vibration device 100. Optionally, the tactile actuator 2 is a piezoelectricity actuator, or a electro-magnetic actuator.

The case 1 includes a frame 11 for forming the accommodation space 10 and a supporting part 12 extending from the frame 11 into the accommodation space 10. The housing 21 is mounted on the supporting part 12.

Further, the frame 11 includes a pair of first sides 111 opposite to each other and a pair of second sides 112 connecting with the first sides 111 for forming the accommodation space 10. In this embodiment, the first side has a length greater than the second side.

In the embodiment, as shown in FIG. 1, the supporting part 12 extends from one of the second sides 112 into the accommodation space 10.

Referring to FIG. 2, the supporting part 12 includes a mounting hole 120 formed therethrough. The supporting part 12 further includes an upper side 121 perpendicular to a vibration direction of the vibration unit, a lower side 122 parallel to the upper side 121, and an inner side 123 connecting the upper side 121 to the lower side 122. The inner side 123 forms the mounting hole 120 and the housing 21 is mounted in the mounting hole 120. The housing 21 includes a first elastic latch 210 extending from an edge thereof toward the upper side 212. The first elastic latch 210 includes a first extending part 2101 extending toward the inner side 1223 and a first elastic arm 2102 extending from the first extending part 2101 toward the upper side 121. The first elastic arm 1201 locates between the inner side 123 and the housing 21, and includes a latching protrusion 2103 abutting against the upper side 121.

The housing 21 further includes a protruding part 211 extending from the edge toward the lower side 122 and opposite to the first elastic latch 210. The protruding part 211 extends perpendicularly from the edge of the housing and abuts against the lower side 122. The first elastic latch 210 latches the supporting part 12 from a side of the upper side 121, and the protruding part 211 abuts against the supporting part 12 from a side of the lower side 122, for positioning the tactile actuator 22 relatively to the upper side and the lower side, by which the tactile actuator 22 is firmly fastened and is protected from being separated from the case.

Optionally, the frame 11 is formed integrally with the supporting part 12.

In this embodiment, the frame 11 and the supporting part 12 are made of metal with small damping coefficient for effectively increase the amplitude of resonance of the frame and the supporting part further for enhancing tactile effects.

Amorphous metal is a preferred material to make the frame and the supporting part.

Optionally, the frame 11 and the supporting part 12 could be made of ceramic or glass. Also, the supporting part 12 could be made of plastic, and the frame 11 could be made of metal. The frame 11 and the supporting part 12 could be formed by Nano-forming process.

Figure 3:
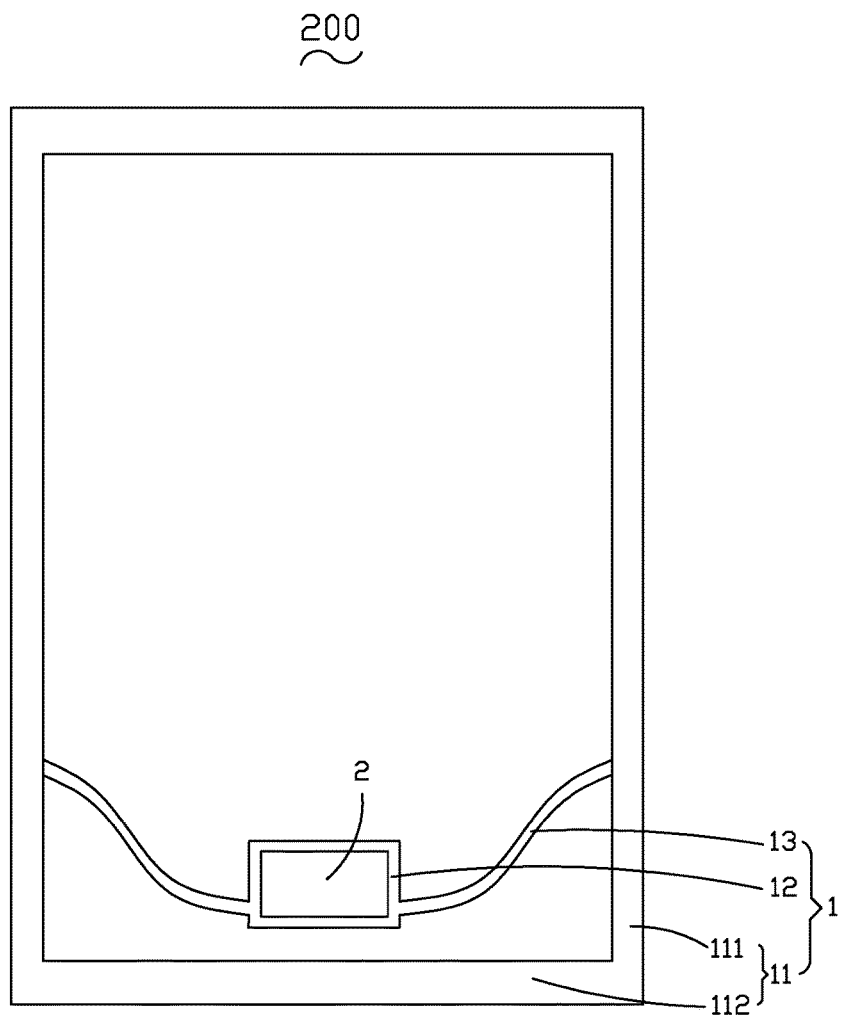
FIG. 3 is a top view of a vibration device in accordance with a second embodiment of the present invention.

A vibration device 200, in accordance with a second embodiment of the present invention, is shown in FIG. 3. The vibration device 200 is similar to the device 100 in the first embodiment. In the first embodiment the supporting part 12 extends from one of the second sides 122 into the accommodation space 10, while, in the present embodiment, as shown in FIG. 3, the case 1 further includes a connecting part 13 extending from one of the first side 111 toward the other first side 11, and two sides of the supporting part 12 are connected to the connecting part 13, which enables the supporting part 12 be suspended between the first sides by the connecting part 13. Thus, the supporting part 12 is connected to the frame 11 via the connecting part 13 and is fixed on the frame 11, by which the vibration produced by the tactile actuator 22 is transmitted to selected position of the frame 11 via the supporting part 12 and the connecting part 13. It should be understood that the selected position may be the portion where the user holds an electronic device, like a mobile phone, for providing better tactile feedbacks.

Figure 4:
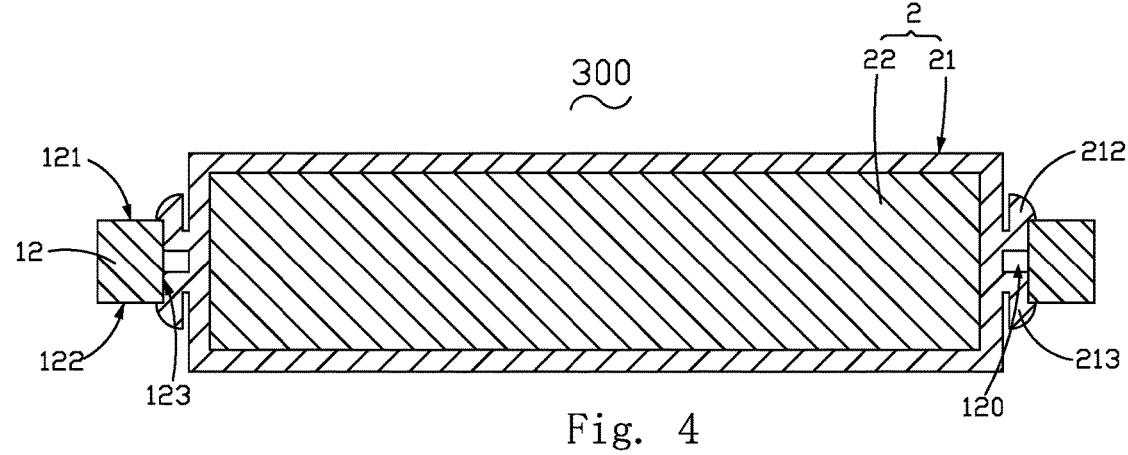
FIG. 4 is a cross-sectional view of a vibration unit and a supporting part of the vibration device in accordance with a third embodiment of the present invention.

Referring to FIG. 4, a vibration device 300, in accordance with a third embodiment of the present invention is disclosed. In this embodiment, the housing 21 further includes a second elastic latch 213 opposite to the first elastic latch 212. The second elastic latch 213 extends from an edge of the housing toward the lower side 122. The second elastic latch 213 and the first elastic latch 212 are opposed to each other and latch two sides of the supporting part 12 symmetrically. Thus, the tactile actuator 22 is fixed by the supporting part 12 from both sides thereof.

Figure 5:
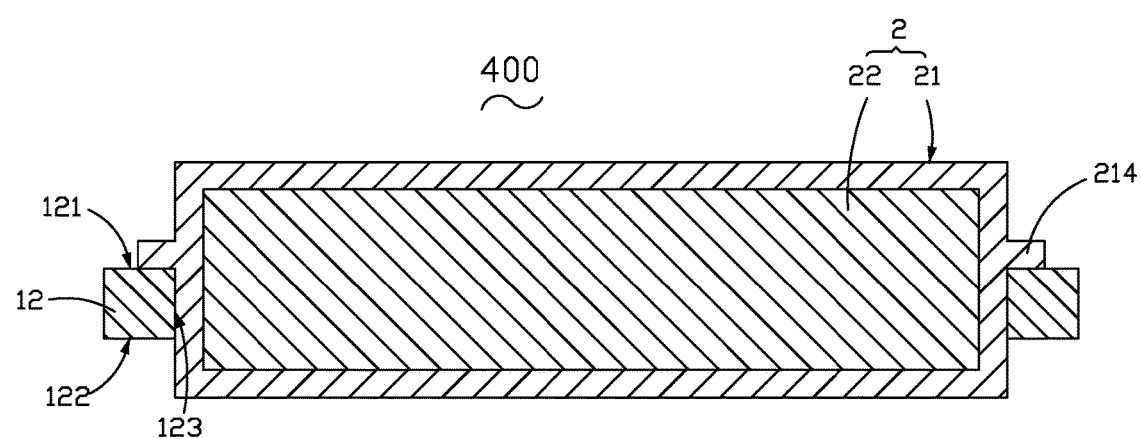
FIG. 5 is a cross-sectional view of a vibration unit and a supporting part of the vibration device in accordance with a fourth embodiment of the present invention.

Referring to FIG. 5, a vibration device 400, in accordance with a fourth embodiment of the present invention, is disclosed. In this embodiment the housing 21 includes a block 214 assembled with the frame by soldering for positioning the vibration unit 2 on the case 1.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration device of an electronic device, comprising:
a case having an accommodation space;
a vibration unit accommodated in the accommodation space and fastened with the case, for transmitting vibration produced by the vibration unit to the case and further driving the case to vibrate direct tactile feedbacks to a user from the electronic device during interaction; wherein
the vibration unit includes a housing attached to the case by latching or soldering for improving a stability of the vibration device, and a tactile actuator fixed in the housing; the case includes a frame and a supporting part extending from the frame into the accommodation space, the supporting part further for enhancing tactile effects, and the housing is fixed with the supporting part.

2. The vibration device of an electronic device as described in claim 1, wherein the supporting part has a mounting hole formed therethrough, the supporting part further includes an upper side perpendicular to a vibration direction of the tactile actuator, a lower side parallel and opposite to the upper side, and an inner side connecting the upper side to the lower side for forming the mounting hole; the housing is mounted in the mounting hole; the housing includes a first elastic latch extending from an edge thereof toward the upper side and including a first extending part extending toward the inner side and a first elastic arm extending from the first extending part toward the upper side, the first elastic arm locates between the inner side and the housing and forms a latching protrusion abutting against the upper side.

3. The vibration device of an electronic device as described in claim 2, wherein the housing includes a protruding part extending toward the lower side and opposite to the first elastic latch, the protruding part extends from an edge of the housing perpendicularly and abuts against the lower side.

4. The vibration device of an electronic device as described in claim 2, wherein the housing includes a second elastic latch extending toward the lower side and opposite to first elastic latch, the second elastic latch and the first elastic latch are disposed at two sides of the supporting part symmetrically.

5. The vibration device of an electronic device as described in claim 1, wherein the frame include a pair of first sides parallel to each other and a pair of second sides connecting the first sides for forming the accommodation space, a length of the first side is greater than that of the second side.

6. The vibration device of an electronic device as described in claim 5, wherein the supporting part extends from one of the second sides into the accommodation space.

7. The vibration device of an electronic device as described in claim 6, wherein the frame is formed integrally with the supporting part.

8. The vibration device of an electronic device as described in claim 5, wherein the case further includes a pair of connecting parts extending from the first sides, respectively, two sides of the supporting part connects to the connecting parts, respectively, and the supporting part is suspended between the first sides by the connecting parts.

9. The vibration device of an electronic device as described in claim 5, wherein the frame and the supporting part are made of one of amorphous metal, ceramic, and glass.

10. The vibration device of an electronic device as described in claim 1, wherein the frame is made of metal, the supporting part is made of plastic, and both of the frame and the supporting part is formed by Nano-forming process.

\* \* \* \* \*